USO05307069A

United States Patent [19]
Evans

[11] Patent Number: 5,307,069
[45] Date of Patent: Apr. 26, 1994

[54] IMPROVED RADAR RECEIVER SYSTEM

[75] Inventor: Norol T. Evans, San Pedro, Calif.

[73] Assignee: Hughes Aircraft Company, Los Angeles, Calif.

[21] Appl. No.: 412,217

[22] Filed: Nov. 2, 1973

[51] Int. Cl.$^5$ .............................................. G01S 7/36
[52] U.S. Cl. ..................................................... 342/19
[58] Field of Search ......................... 343/7 A, 100 LE

[56] References Cited

U.S. PATENT DOCUMENTS

| | | | |
|---|---|---|---|
| 3,094,695 | 6/1963 | Jahn | 343/100 LE |
| 3,164,832 | 1/1965 | Varela | 343/7 A X |
| 3,167,761 | 1/1965 | Le Parquier | 343/100 LE |
| 3,349,402 | 10/1967 | Foster | 343/100 LE |
| 3,706,389 | 12/1972 | Taylor, Jr. | 343/7 A |
| 3,781,883 | 12/1973 | Effinger | 343/7 A |

Primary Examiner—T. H. Tubbesing
Attorney, Agent, or Firm—Wanda K. Denson-Low

[57] ABSTRACT

An improved radar receiver having side lobe blanking and coherent side lobe cancellation circuits in the main receiver channel and a control arrangement that overcomes the conventional problem that the side lobe blanking circuit will also blank a noise jammer signal even after the coherent side lobe canceller circuits have acquired the jamming energy. In this system, the side lobe blanking circuits are mechanized with a logarithmic amplifier and with a fast time constant circuit in an auxiliary receiver channel. The fast time constant is selected to match or be slightly longer than the acquisition time constant of the coherent side lobe cancellers. This implementation allows the side lobe blanking circuits to be energized at all times, thus simplifying the operational control of the system. In some arrangements in accordance with the invention the fast time constant may be varied as a function of the amplitude of the jamming signal in the main channel.

7 Claims, 4 Drawing Sheets

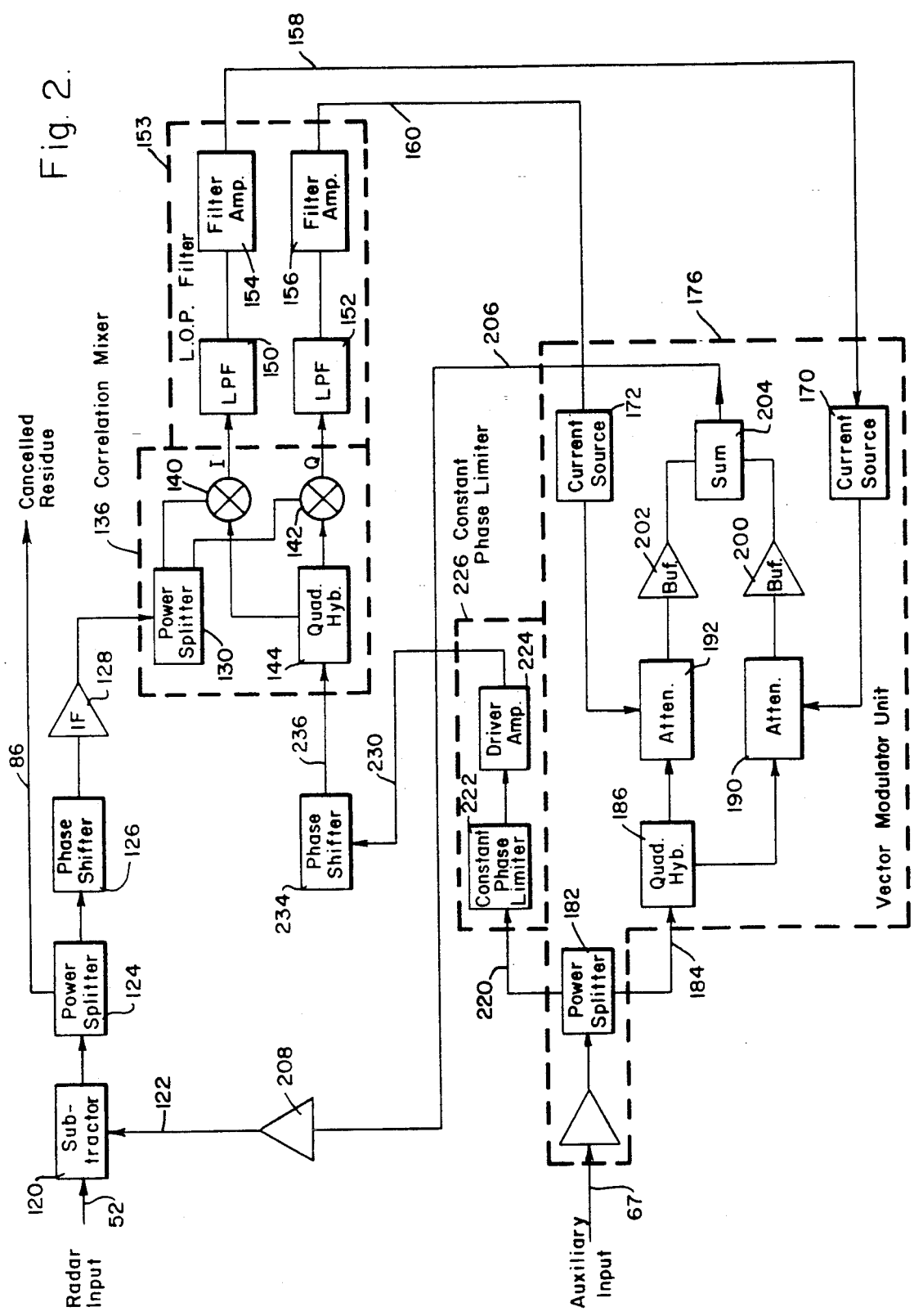

IMPROVED RADAR RECEIVER SYSTEM

GOVERNMENT RIGHTS STATEMENT

The invention described herein was made in the course of or under a Contract or Subcontract thereunder with the Department of the Navy.

BACKGROUND OF THE INVENTION

1. Field of Invention

This invention relates to radar receivers that overcome the effect of interfering noise sources and pulse sources and particularly to a receiver that is compatible with both coherent side lobe cancellation and side lobe blanking operation so as to blank out a minimum of possible target signals.

2. Description of the Prior Art

Coherent side lobe cancellers (CSLC) are designed primarily to cancel continuous jamming such as noise jamming or CW (Continuous Wave) jamming. Also incorporated with the CSLC circuit in many receiver systems is a side lobe blanking (SLB) circuit which is used primarily to blank interfering or jamming pulses which are of such a short time duration that the CSLC circuit cannot acquire and cancel these pulses. The coherent side lobe cancellation usually is performed in conventional systems immediately after the second converter and prior to the matched filter in the receiver, while the side lobe blanking is performed at the video output of the receiver. As a result, these two processes occur sequentially in the receiver processing chain and the conventional side lobe blanking circuit has been found to also blank the noise jammer even after the CSLC circuits have acquired and are cancelling the jamming signal. It would be a substantial improvement to the art to provide a compatible type system that allows the side lobe blanking circuit to blank only the leading edge of a noise jammer so that after the CSLC circuits have acquired the jammer, the SLB circuits are automatically deactivated except that the SLB circuits will still blank any pulse interference larger than the noise jamming signal that occurs during the jamming interval.

SUMMARY OF THE INVENTION

In the receiver in accordance with the principles of the invention, the coherent side lobe cancelling circuits are continually energized and the selected time constant circuit which provides a controlled time constant or controlled length signal, is positioned in the auxiliary channel path to effectively limit the response time of the side lobe blanking comparison. The side lobe blanking circuits may be mechanized with a logarithmic amplifier and with the selected fast time constant in the auxiliary channel selected to match or be slightly longer than the acquisition time constant of the coherent side lobe cancellers. Thus, the side lobe blanking circuits are energized at all times, greatly simplifying the operational control of the system and allowing the coherent side lobe canceller to operate substantially independent of the side lobe blanking operation.

It is therefore an object of this invention to provide a radar receiver system that overcomes interfering signals while reliably processing target return signals.

It is a further object of this invention to provide a radar receiver in which side lobe blanking and coherent side lobe cancellation both operate in a substantially independent manner.

It is a still further object of this invention to provide a compatible radar receiver system that allows the side lobe blanking circuits to blank only the leading edge of a noise jammer and to then release control to the coherent side lobe canceller system so that continuous side lobe blanking is not present.

It is another further object of this invention to provide a radar receiver system that reliably overcomes the effect of both continuous jamming and interfering or jamming pulses.

It is another object of this invention to provide a radar receiver system utilizing both side lobe blanking and coherent side lobe cancelling to operate in a substantially independent manner with a minimum of control requirements.

BRIEF DESCRIPTION OF THE DRAWINGS

The novel features of this invention as well as the invention itself both as to its method of organization and method of operation, will best be understood from the accompanying description taken in connection with the accompanying drawings, in which like reference characters refer to like parts, and in which:

FIG. 2 is a schematic block diagram of a coherent side lobe canceller circuit that may be utilized in the system of FIG. 1.

DESCRIPTION OF THE PREFERRED EMBODIMENT

Figure 1:
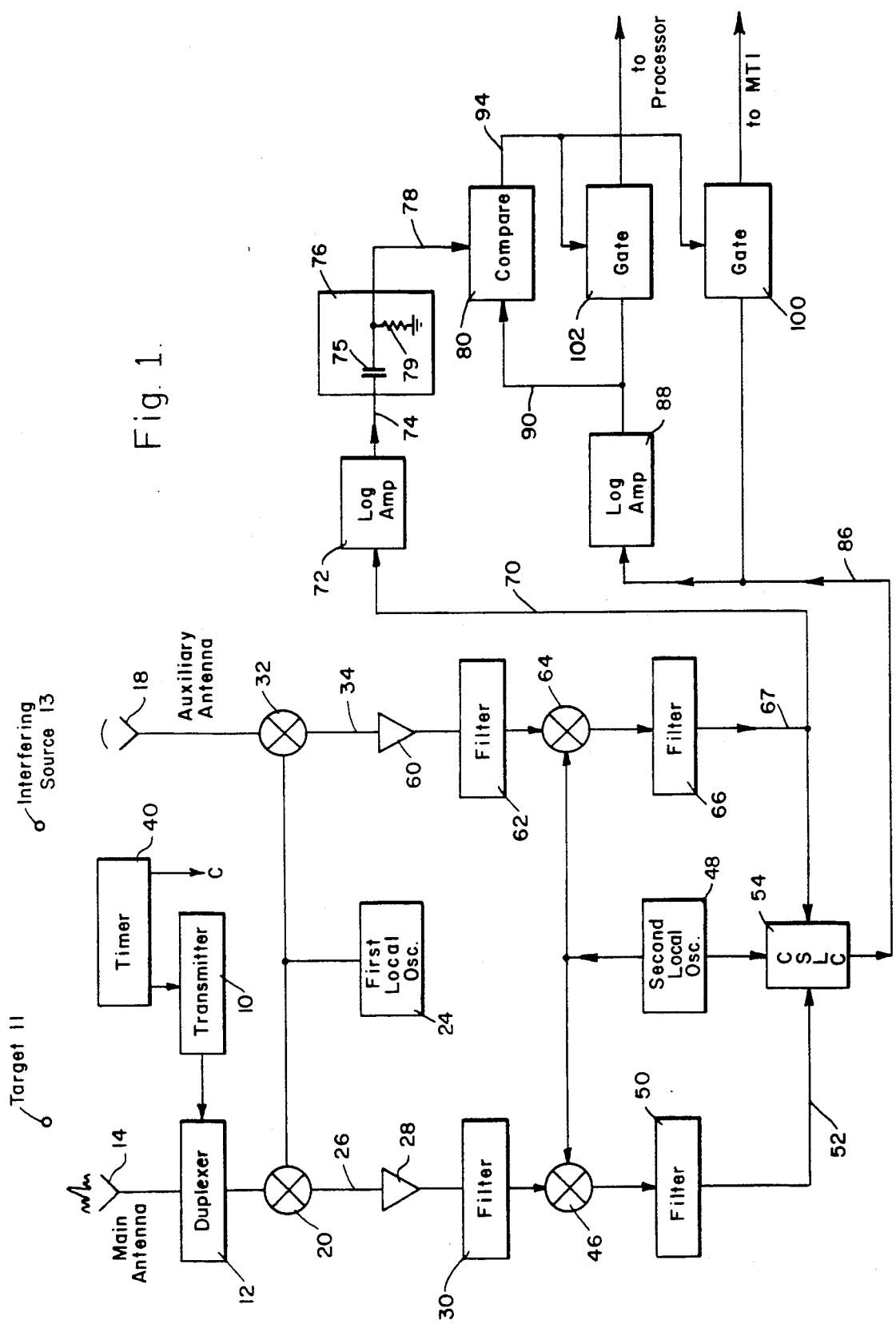
FIG. 1 is a schematic block diagram of the improved radar receiver system in accordance with the principles of the invention.

Referring first to FIG. 1 which shows a radar system in accordance with the principles of the invention operating with both side lobe blanking and coherent side lobe cancelling functions. A transmitter 10 may be provided to transmit pulses of energy through a suitable duplexer 12 and an antenna 14 into space to be reflected from objects and targets such as 11 and intercepted by the main antenna 14 as well as by an auxiliary antenna 18. The energy intercepted by the antenna 14 and passed through the duplexer 12 is applied to a conventional first mixer 20 responsive to a local oscillator 24 for applying a radar IF (Intermediate Frequency) signal to a lead 26 and through an amplifier 28 to a filter 30. At the same time, energy may be received both from an interfering source 13 and from the target 11 by antenna 18 and applied to a mixer 32 to provide a side lobe IF signal on a lead 34. The interfering source 13 may be any operating radar system or jamming system providing interference energy, a side lobe repeater or any pulse interference generator responsive to the received PRF, for example. As is well known in the art, side lobe blanking is used primarily to blank interfering or jamming pulses which are of such a short time duration that the other types of cancelling arrangements are unable to acquire these pulses. Coherent side lobe cancellers operate primarily to cancel continuous jamming such as may be provided by noise jamming or continuous wave (CW) jamming. Although the antenna 14 receives the interfering signal when the antenna 18 receives the target reflection signals, the selected gains of the antennas 14 and 18 allow the signals to be distinguished by the side lobe blanking circuits. A timer 40 controls the timing of the transmission pulses and may provide clock (C) pulses to define the range bins during each pulse repetition interval. The IF radar signal on the main channel is applied from the filter 30 to a mixer 46 responsive to a second local oscillator 48 to develope a second IF signal which is applied from the mixer 46 through a suitable filter 50 to a lead 52 and in turn to a coherent side lobe canceller (CSLC) circuit 54. The signal on the lead 34 in the auxiliary channel is applied through an amplifier 60 and a filter 62 to a mixer 64 also controlled by the second local oscillator 48 with a second IF signal being passed through a filter 66 and through a lead 67 to the coherent side lobe canceller signal 54. It is to be noted that the principles of the invention are not to be limited to any particular type of radar system but are applicable to any radar system requiring coherent cancelling and side lobe blanking.

To provide the side lobe blanking operation, a lead 70 coupled to the lead 67 carries the signal from the auxiliary channel through a suitable amplifier such as a logarithmic or log amplifier 72 and through a lead 74 to a fast time constant circuit 76 which provides a controlled response or a controlled length signal. A conventional RC circuit may be utilized for the circuit 76 which may include a capacitor 75 and a resistor 79 operates as a differentiating circuit to pulses applied thereto to pass a signal that decreases to a predetermined level at a time equal to the CSLC acquisition time. Because the transmission response of the coherent side lobe canceller circuit is an inverse function of the amplitude of the jamming signal, a small signal requiring a longer response time, the time constant of the circuit 76 may be selected for an expected maximum jamming signal operation level. The auxiliary signal controlled by the circuit 76 is applied through a lead 78 as the auxiliary signal for a comparison in a compare circuit 80. If the amplitude of the signal on a lead 78 is greater than the amplitude of the signal in the main channel, then side lobe blanking occurs usually on a range bin by range bin basis. The main channel signal after passing through the coherent side lobe canceller circuit 54 is applied through a lead 86 to a suitable amplifier such as a logarithmic amplifier 88 and in turn through a lead 90 to the compare circuit 80 which in turn is energized to provide a blanking signal on a lead 94 when the auxiliary signal on the lead 78 is of a greater amplitude than the main radar signal on the lead 90. The coherent side lobe canceller residue signal on the lead 86 may be applied through a blanking gate 100 to a suitable utilization circuit such as a moving target indicator unit and from the lead 90 to a gate 102 through another suitable utilization circuit such as a processor or a display. The gates 100 and 102 are coupled to the lead 94 to be blanked in response to a blanking signal developed by the compare circuit 80. The invention is not limited to logarithmic amplifiers 72 and 88 which have the advantage of an easily attained large dynamic range, but conventional linear amplifiers may be utilized.

The side lobes of the main radar antenna 14 have an amplitude substantially lower than the main lobe and the gain between that of the auxiliary antenna 18 and the side lobe gain of the main antenna 14 may be, for example, selected to be approximately 6 db. Thus, energy from the interfering source 13 has a gain in the auxiliary antenna greater than the side lobe gain in the main antenna 14. Energy received from the interfering source 13 is interpreted as side lobe or interfering energy to be blanked out in response to a comparison of the side lobe signal amplitude to the radar signal amplitude in which the side lobe signal amplitude is larger.

Referring now to FIG. 2 which shows the coherent side lobe canceller circuit 54, the radar return signal on the lead 52 is applied to a subtractor 120 which also receives a feedback signal on a lead 122 to apply a difference signal to a power splitter 124, which signal is a cancelled residue and is applied to the output lead 86. The residue signal is applied from the power splitter 124 through a phase shifter 126 and an IF amplifier 128 to a power splitter 130 of a correlation mixer circuit 136. The signal from the power splitter 130 is applied to mixer units 140 and 142 which are controlled by an in-phase and a quadrature signal received from a quadrature hybrid 144. The mixers 140 and 142 provide in-phase I and quadrature Q components which are applied through respective low pass filters 150 and 152 and respective filter amplifier circuits 154 and 156 to respective leads 158 and 160. The filtered signals from leads 158 and 160 are applied to respective current sources 170 and 172 of a vector modulator unit 176. The auxiliary signal of lead 67 is applied through an IF amplifier 180 to a power splitter 182 and through a lead 184 to a quadrant hybrid 186 provides in-phase and 90° out-of-phase signals that are applied to respective attenuators 190 and 192, in turn responsive to respective current sources 170 and 172. The signals provided by the attenuators 190 and 192 are applied through respective buffer units 200 and 202 to a summing circuit 204 which applies a combined and rotated vector signal through a lead 206 and an amplifier 208 to the lead 122 as the feedback signal to the second input of the subtractor 120 for providing vector cancellation of the interfering signal on the lead 52.

To control the correlation mixer the power splitter 182 applies a signal through a lead 220 to a constant phase limiter 222 and a driver amplifier 224 of a constant phase limiter circuit 226 to a lead 230. A trimming phase shifter 234 which may be utilized in some arrangements applies the auxiliary reference signal through a lead 236 to the quadrant hybrid 144 for controlling the correlation mixer operation.

Thus, the output of the main channel and the auxiliary channel are coupled to a band pass cross-correlator which develops an output signal representing the amplitude and phase difference of the components of the undesired signal in each of the two channels. The cross-correlator output is then heterodyned with the offset intermediate frequency signal of the auxiliary channel in order to produce an auxiliary channel output at the same frequency as the intermediate frequency and the main channel and with any phase difference removed. This cross-correlator output signal is then coupled to the subtractor circuit in the main channel which subtracts it from the signal in the main channel closing the loop and providing continuous cancellation of the jamming signal on the output of the main channel.

The principles of the invention are not limited to using a single CSLC circuit but may operate with a plurality of CSLC circuits each having its loop signal on the lead 206 applied to a vector summer with the summed output applied to the subtractor 120. The cancelled output signal out of the amplifier 128 is then applied not only to the power splitter 130 but also to a similar correlation mixer in each of the other CSLC circuits.

Figure 3:
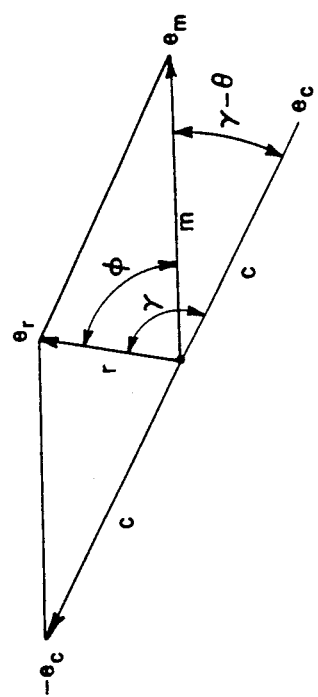
FIG. 3 is a schematic vector diagram for further explaining the operation of the coherent side lobe canceller system of FIG. 2.

Referring now also to the vector diagram of FIG. 3, the cancellation operation leaves a residue $e_r$ as a result of the subtraction of the vector $e_c$ the vector in the main channel $e_m$. In the IF cross-correlator this residue is multiplied by $e_c$ and the products smoothed by the narrow band integrating filter 26 which is located at a selected difference frequency $\omega$. The I and Q residue may be expressed as $$r \cos \phi = m - ra^2 G \cos(\alpha - \phi) P_J$$

$$r \sin \phi = -ra^2 G \sin(\alpha - \phi) P_J$$

where $P_J$ is a jammer power.

Solving for the two above equations $$\frac{r}{m} = \frac{1}{\cos\phi + a^2 G \cos(\alpha - \phi) P_J}$$

also the expression can be rewritten $$\sin(\alpha - \phi) = \frac{-\sin\phi}{a^2 G P_J}$$

If $\alpha = \phi$ for cancellation $$\frac{r}{m} = \frac{1}{\cos\phi + a^2 G P_J}$$

and if $\phi = 0$ $$\frac{r}{m} = \frac{1}{1 + a^2 G P_J}$$

Thus the loop attempts to adjust the residue phase $\phi$ so as to cancel the loop phase $\alpha$. When the loop phase $\alpha$ is adjusted to 0 and $\phi = 0$, then $$\frac{r}{m}$$

is equal to the value provided in the last equation, which equation shows the degree of jammer cancellation that is obtained with the loop gain being a function of the jammer power $P_J$. The operation of the coherent side lobe canceller will not be explained in further detail as it is well known in the art such as the description in U.S. Pat. No. 3,202,990, Intermediate Frequency Side Lobe Canceller invented by P. W. Howells.

Figure 4:
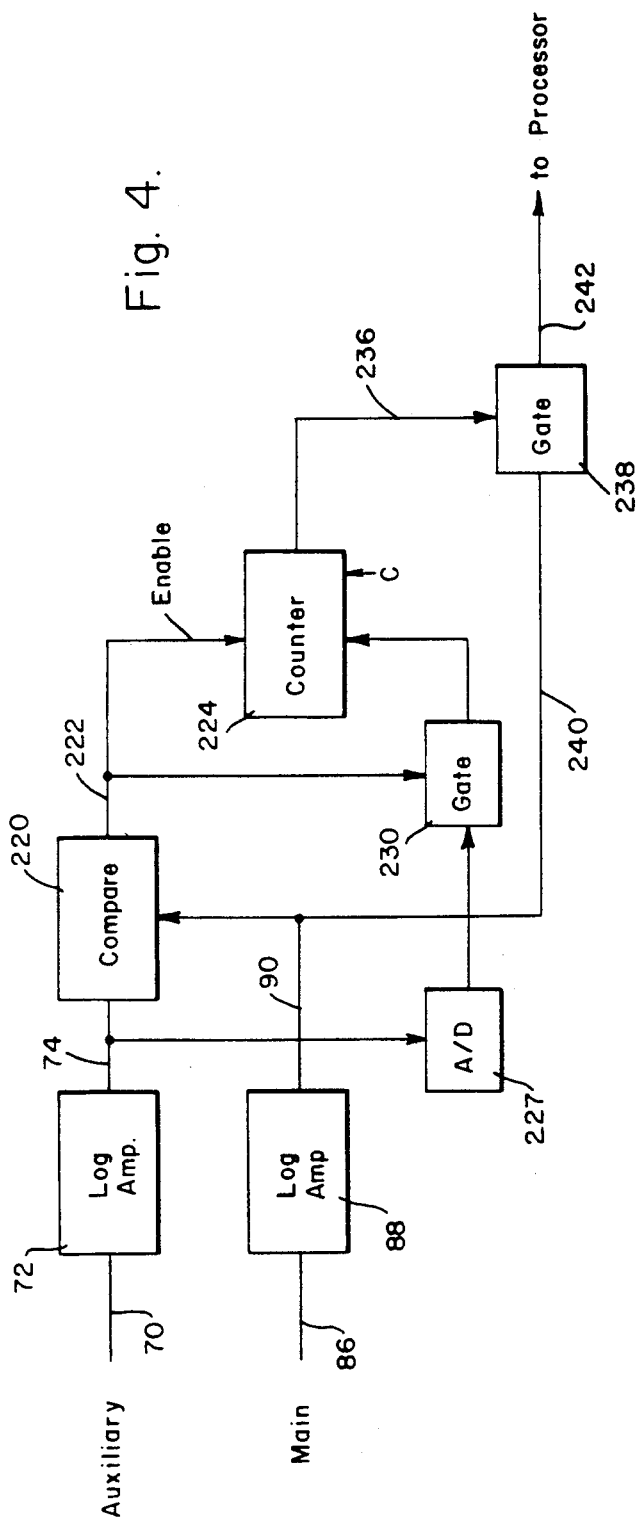
FIG. 4 is a schematic block diagram of a time constant control system in accordance with the principles of the invention utilizing a variable time constant.

Referring now to FIG. 4, an arrangement is shown in accordance with the principles of the invention utilizing a variable time constant. The response time of the CSLC circuits is an inverse function of the amplitude of the jamming signal so that for matched operation the side lobe blanking interval may vary as an inverse function of the jamming signal amplitude. The typical transient response of a coherent side lobe canceller is approximately equal to $$e^{-(e_aKA)t}$$

where
K = loop gain
A = band width of the narrow band filters 150 and 152
$e_a$ = auxiliary input signal in volts
t = time Thus the exponent of the above expression is inversely proportional to RC so that a large signal $e_a$ provides a fast transient response. A compare circuit 220 responds to the logarithmic signals on the leads 74 and 90 to generate a blanking gate on a lead 222 when the amplitude of the auxiliary signal exceeds the signal in the main channel. The signal on the lead 222 which may be considered an enable signal, is applied to a counter 224 to initiate a counting operation when a side lobe blanking condition is present. A signal on the auxiliary channel applied from the lead 74 through an A-D converter 227 and a gate 230 provides a set signal to the counter 224. The gate 230 which is an "AND" gate also responds to the enable signal on a lead 222 so that the amplitude of the signal on the main channel determines the setting of the counter and resulting time constants. A large amplitude signal on the lead 90 sets a large value into the counter 224 and results in the forward counter overflowing in a shorter time in response to clock pulses C. When the counter 224 overflows in a forward counter arrangement, the blanking signal is provided on a lead 236 which energizes a gate 238 coupled through a lead 240 to the lead 90 to pass the main radar signal or the cancelled residue signal to an output lead 242, which signal for example, may be applied to suitable utilization circuits such as a processor. Other gates may be controlled such as gate 100 of FIG. 1. Thus the arrangement of FIG. 4 allows the amplitude of the signal in the auxiliary channel to control the time constant so that a lower amplitude signal provides a longer time constant to the side lobe blanking operation to match the CSLC circuit response time.

Figure 5:
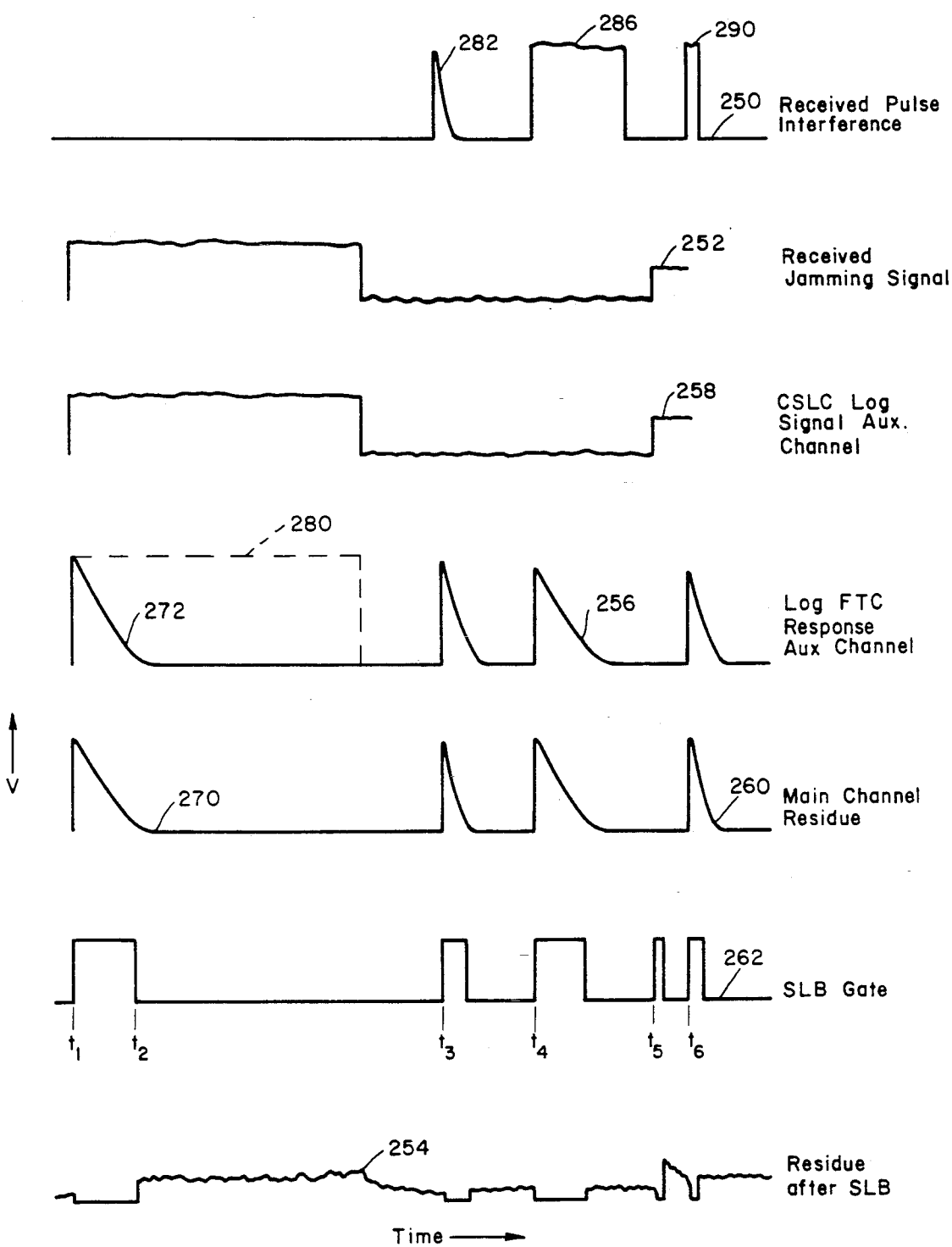
FIG. 5 is a schematic diagram of waveforms showing voltage amplitude as a function of time for further explaining the operation of the system in accordance with the invention.

Referring now to FIG. 5 as well as to FIGS. 1 and 2 the operation of the system of the invention will be explained in further detail. The received pulse interference is shown by pulses of a waveform 250 and the received jamming signal is shown by the waveform 252. The acquisition response of the coherent side lobe canceller circuits in the main channel is shown by the main channel residue of a waveform 260 and the fast time constant response of the auxiliary channel provided by the fast time constant circuit in accordance with the invention, is shown by a waveform 256 substantially matching the time constant of the main channel. The log signal in the auxiliary channel at the output of the coherent side lobe canceller circuit is shown by waveform 258 and the residue signal after side lobe blanking is shown by a waveform 254. The side lobe blanking gate generated by the system of the invention is shown by the waveform 262 with the gate width control so as to not substantially nullify the effect of the coherent side lobe canceller operation in the main channel. Consider a first case of system operation in which initially no jamming is present, noise jamming then being suddenly initiated at a time $t_1$ as indicated by the received jamming signal of the waveform 252. The noise residue in the main channel then increases to the jamming level and then decreases following a typical RC discharge curve as a coherent canceller acquires a jamming signal, indicated at 270 of waveform 260. Consequently, except for the initial transient period of the noise level, the sensitivity in the main channel can be substantially unaffected if the jamming level is less than the cancellation capability of the system. Because the transient on the auxiliary channel is larger in magnitude than the main channel transient, the side lobe blanking gate of the waveform 262 is generated during this interval and this gate is used to blank the main channel transient. Because of the fast time constant response of the waveform 256 as indicated at 272 the blanking gate of the waveform 262 has a predetermined width so that blanking is terminated at time $t_2$ rather than at some later point in time if the auxiliary channel noise were to maintain its amplitude as indicated by a dotted line 280.

A second situation in which the invention reliably operates is when jamming energy is not present as shown by waveform 252 and pulse interference occurs from pulses such as 282 of the waveform 250 with widths equivalent to the radar pulse widths. In this condition the coherent cancellers have a negligible effect on the short interference pulses but the side lobe blanker will blank them at a time $t_3$ as shown by the waveform 262. The residue after side lobe blanking is only blanked for a short interval as shown by the waveform 254.

In another condition, jamming may not be present but pulse interference occurs from pulses such as 286 with widths much larger than the radar pulse width. The coherent cancellers will cancel these pulses such as 286 except for the leading edge portion during which the side lobe blanker will blank by a gating signal of the waveform 262 at a time $t_4$. For blinking noise jammers the system response to blank the leading edge is similar to that explained relative to the pulse 286 with the coherent cancellers cancelling after the fast time constant has fallen in the auxiliary channel.

Another interference condition controlled by the system of the invention is moderate level jamming as shown by the waveform 252 and a high level interference pulse as shown by the waveform 290. The side lobe blanker operates to blank the jamming signal at a time $t_5$ and then to blank high level pulses as shown by the blanking gate signal of the waveform 262 at a time $t_6$. Thus the system operates to deactivate the side lobe blanking after an interval determined by the controlled time constant or response circuit and to then again provide a blanking time constant for high level pulses larger in amplitude than that of the noise jamming signal. However, it is to be noted that if the pulses are wide enough for the cancelling loops to acquire the wide pulses, a noise transient may occur following the interfering pulse with some circuit designs, but it has been found that the noise transient usually has a relatively small amplitude. Thus, the system in accordance with the invention, operates with the side lobe blanking circuits energized at all times during radar operation and with the fast time constant circuit automatically controlling the operating time of the side lobe blanker so that the coherent side lobe canceller effectively acquires the interference signal at the termination of the side lobe blanking operation.

Thus, there has been described an improved receiver system that allows side lobe blanking circuits to blank only the leading edge of a noise jammer and after the coherent side lobe canceller circuits have acquired the jamming signal the side lobe blanking circuits are automatically deactivated, except that the side lobe blanking circuits will still blank any pulse interference larger than the noise jammer that occurs during the jamming interval. The system operates by having the coherent side lobe canceller circuits operable at all times when the system is energized so that all narrow interfering pulses or leading edge of wide interfering pulses are blanked by the side lobe blanking operation. By allowing the coherent side lobe canceller to operate and cancel the interfering jamming signals the system operating with a minimum of controls and provides valid radar target pulses to be passed through the receiver to utilization circuits such as displays or processors.

What is claimed is:

1. A radar receiver having a main channel and an auxiliary channel and receiving jamming, interfering pulses and target pulses comprising:

coherent cancelling means coupled to said main channel and to said auxiliary channel for cancelling jamming signals and having an output terminal, said coherent cancelling means having a predetermined response time, circuit means coupled to said auxiliary channel for providing a decreasing voltage representation of a fast time constant to signals received from said auxiliary channel, said circuit means having said time constant selected to be substantially equal to the response time of said coherent cancelling means, comparison means coupled to said circuit means and to the output terminal of said coherent cancelling means for providing a blanking signal in response to a predetermined comparison signal from said auxiliary channel and said output terminal, and gating means coupled to the output terminal of said coherent cancelling means and to said comparison means for being blanked in response to a blanking signal.

2. The combination of claim 1 in which first logarithmic means is coupled between said auxiliary channel and said circuit means and second logarithmic means is coupled between the output terminal of said coherent cancelling means and said comparison means and said gating means.

3. The combination of claim 1 in which said comparison means has said predetermined comparison when the signal on the auxiliary channel has a greater amplitude than the amplitude of the signal at the output terminal of said coherent cancelling means.

4. The combination of claim 1 in which said circuit means is an R-C circuit.

5. A radar receiver having a main channel and an auxiliary channel and receiving jamming, interfering pulses and target pulses comprising:

coherent cancelling means coupled to said main channel and to said auxiliary channel for cancelling jamming signal and having an output terminal, circuit means coupled to said auxiliary channel for providing a decreasing voltage representation of a fast time constant to signals received from said auxiliary channel, said circuit means being a digital counter means coupled to said main channel for being set to a value to provide a time constant as a function of the amplitude of the signal on said auxiliary channel and coupled to said output terminal for providing a blanking pulse, comparison means coupled to said circuit means and to the output terminal of said coherent cancelling means for providing a blanking signal in response to a predetermined comparison signal from said auxiliary channel and said output terminal, and gating means coupled to the output terminal of said coherent cancelling means and to said comparison means for being blanked in response to a blanking signal.

6. The combination of claim 5 in which said digital counter means includes a digital counter, converter means for providing a digital number representative of the amplitude of the signal on said main channel and gating means coupled between said converting means, said digital counter and the output terminal of said compare means for setting the counter when a blanking signal is developed.

7. The combination of claim 5 in which the time constant is inversely proportional to the amplitude of the signal.

* * * * *